July 22, 1969  K. J. CHAPMAN ET AL  3,456,838
CLOSURE ARRANGEMENTS FOR APERTURES Filed May 18, 1967  2 Sheets-Sheet 2

KEITH J. CHAPMAN.
JAMES E. H. COSIER.
INVENTORS

BY *Hull & Houghton*

ATTORNEY

United States Patent Office 3,456,838
Patented July 22, 1969

3,456,838
CLOSURE ARRANGEMENTS FOR APERTURES
Keith James Chapman, Chorley Wood, and James Edwin Henry Cosier, Northolt Park, England, assignors to Her Majesty's Postmaster General, London, England
Filed May 18, 1967, Ser. No. 639,447
Claims priority, application Great Britain, May 25, 1966, 23,369/66
Int. Cl. B65d 53/00
U.S. Cl. 220—46                             8 Claims

ABSTRACT OF THE DISCLOSURE

Closure for use with submerged repeater housing. The aperture to be closed has a peripheral wall having several external circumferential projections. The closure also has several external projections and is retained in the aperture by means of a moulded polythene seal which completely surrounds the adjacent projections on the wall and closure.

---

This invention relates to closure arrangements for apertures and is particularly concerned with closure arrangements for use in the construction of submerged repeater housing units for electric or other cable systems.

In the construction of such repeater housings, the repeater or inner unit of the housing is sealed in a tubular casing in such a manner that penetration of water or water vapour is prevented and closure of this casing around the inner unit is normally effected by means of a bulkhead, through which the cable passes, seated on a shoulder in the casing. It is known to braze the bulkhead to the casing but the success of brazing depends upon very close control of the conditions such as temperature, time and fluxing and on the compositions of the steel and brazing alloy. It is also known for the bulkhead to include O-ring seals and to be fixed in position against the shoulder of the casing by screwing a retaining ring against the face of the bulkhead thus completing the sealing off of the inner unit. However, the life of the rubber rings is uncertain. To ensure exclusion of moisture from the inner unit, a lead seal may be provided at the base of the bulkhead. In this case the bulkhead is provided with a boss extending within the casing so as to confine the lead seal in a position between the bulkhead and the casing.

It is an object of the present invention to provide an improved closure arrangement.

According to the present invention a closure arrangement for an aperture comprises a peripheral wall round the aperture, the wall carrying a plurality of external circumferential projections (hereafter referred to as an "externally castellated peripheral wall"), an aperture closure member having a periphery carrying a plurality of external circumferential projections (hereafter referred to as "castellations"), an end face of which projections is in proximity to an end face of the projections of the peripheral wall round the aperture when said aperture is closed, and a moulded seal completely surrounding the adjacent projections of the wall and closure member.

Advantageously the moulded seal is of polythene.

The closure member may be provided with a boss adapted to extend within the peripheral wall round the aperture in such a manner that the mating between the closure member and the aperture is improved.

Preferably, the external face of the peripheral wall is adapted to carry an annular sleeve member which provides an extension of the wall over the closure member, the sleeve being internally threaded at its distal end to enable a retaining ring to be screwed therein to assist in holding the closure member in position in the aperture.

The closure arrangement may include a sealing ring, preferably of lead, positioned between the closure member and the inside of the base of the peripheral wall round the aperture.

The aperture closure member may be provided with a peripheral skirt carrying the plurality of external circumferential projections, the skirt having an end face which is adjacent to but spaced from the end face of the peripheral wall round the aperture, the moulded seal completely surrounding the projections of both the closure member and the peripheral wall round the aperture, and also penetrating the space between the end faces thus preventing excessive stresses being imposed on the castellated sealing surfaces. Further reduction of that stress can be achieved by forming a circumferential groove in the outer surface of the portion of the moulded seal penetrating the space between the end faces, thus reducing the thickness of that portion of the moulding.

As examples only, a repeater housing embodying the invention will now be described in greater detail with reference to the accompanying drawings of which:

Figure 1:
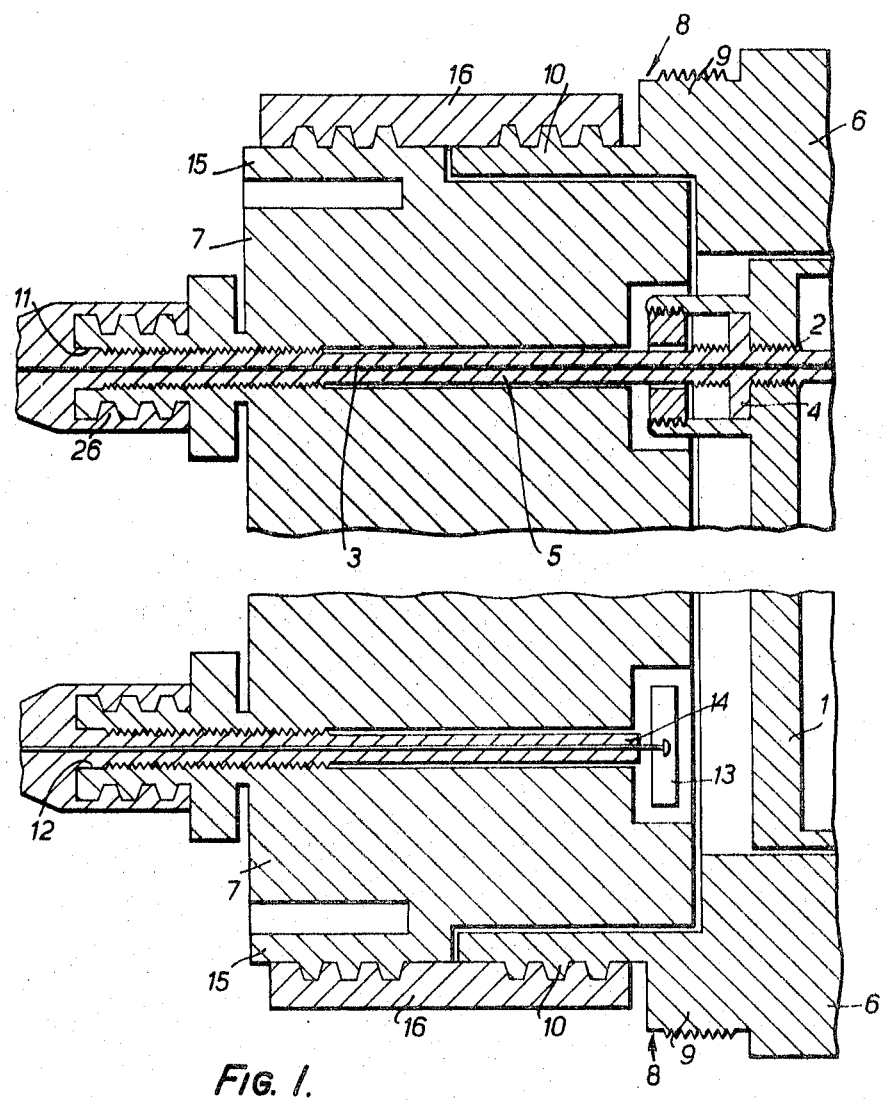
FIG. 1 is a cross-section through part of a first embodiment.

Referring to FIG. 1, the inner unit of the repeater is housed in an internal casing, an end wall of which is shown at 1, this end wall containing a screw-threaded aperture 2 permitting passage of a cable 3 to the inner unit. The sealing arrangement of the cable 3 within the aperture 2 is achieved in known manner by a circular flange 4 moulded on to the insulation 5 of the cable 3 and providing a disk seal which abuts the end casing 1 and forms a seal for said aperture 2. The internal casing housing the repeater unit is surrounded by an outer alloy steel casing 6 of heavy construction. Closure of this casing around the unit is completed by a bulkhead 7, which may be of steel or other suitable material.

The casing 6 surrounding the inner unit, which casing forms the aperture to be closed by bulkhead 7, is provided with a peripheral, axial projection or wall 8 formed round the whole of the circumference of the casing, this projection comprising a reduced diameter externally threaded first portion 9 and a further reduced diameter, castellated skirt second portion 10. The castellations of the second portion extend round the whole of the circumference of the wall 8.

The bulkhead 7, which forms the closure member, is constructed so that part of its external surface mates closely with the internal surface of the projection 8, when the bulkhead is placed in the position shown in FIG. 1. The end face of the bulkhead contains a first aperture 11 extending through the bulkhead and adapted to receive the insulated cable 3, and a second aperture 12 also extending through the bulkhead and adapted, for example, to receive a moisture detector 13 connected to the insulated cable 14. Attached to the bulkhead 7, but spaced from it as shown, is a wall or periphery 15 provided with external castellations, the wall extending parallel to the outer surface of the bulkhead around the whole of the circumference thereof.

On placing the bulkhead 7 in position to abut the casing 6, the skirt 10 of the casing and wall 15 of the bulkhead lie co-axial with and adjacent to each other.

A polythene moulding 16 is then formed round the adjacent castellations on the portion 10 and the wall 15, the method of and apparatus for producing the seal being described in detail in the specification of co-pending patent application No. 659,247.

Figure 2:
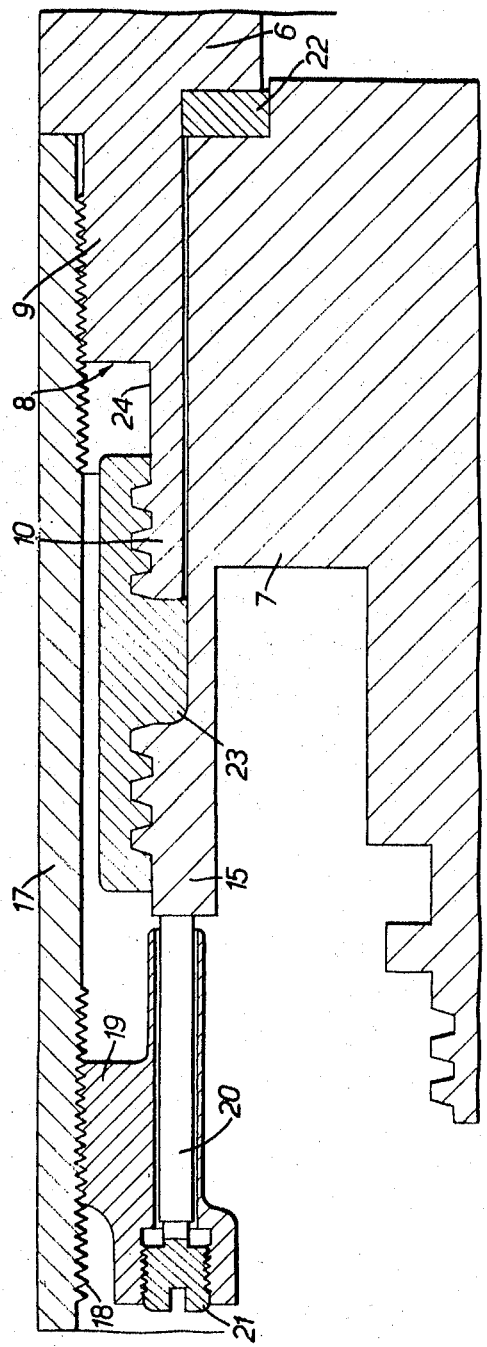
FIG. 2 is a cross-section through part of a modified embodiment.

After sealing together the bulkhead 7 and casing 6, an extension ring 17 is threaded on to the portion 9 of the axial projection 8 on the casing as shown in FIG. 2. The extension ring 17 is internally threaded at its outer end 18 to receive a threaded retaining ring 19. A number of screw-threaded holes equi-spaced round the retaining ring carry push-rods 20 and screws 21 positioned as in FIG. 2 to act on the end face of the wall 15 thereby holding the bulkhead 7 more securely against its seating on the casing 6.

FIG. 2 also shows the insertion of a lead seal 22 between the bulkhead and casing to assist in the prevention of the diffusion of water or water vapour into the inner unit. The push-rods 20 and pressure screws 21 acting from the retaining ring 19 are then used to maintain an adequate pressure on the lead seal 22. To avoid imposing excessive stresses on the castellated surfaces of the polythene moulding, the construction has been modified to permit the introduction of a portion 23 which allows some longitudinal compression of the polythene sealing ring 16 to take place without introducing the undesired stresses in those surfaces. The skirt 10 of the casing 6 shown in FIG. 2 is longer than that shown in FIG. 1 to permit cooling of the portion 24 thereof during the moulding operation thus limiting the penetration of polythene along the gap between the skirt 10 and bulkhead 7. The recess in the bulkhead behind the castellated wall 15 has also been enlarged and deepened to permit the insertion of a heater centrally behind the castellated area.

Figure 3:
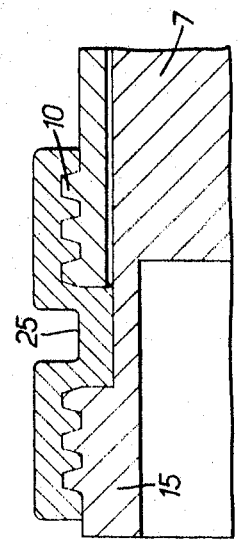
FIG. 3 shows a further modification of part of the arrangement of FIG. 2.

FIG. 3 shows a modification of the construction shown in FIG. 2 in which there is a reduction in thickness of the moulding at 25 to reduce stresses which might be imposed on the castellated sealing surfaces by movement of the bulkhead 7.

The method of producing the circumferential moulding around the joint between the main casing and the bulkhead of the submarine repeater housing described in co-pending patent application No. 659,247 provides a high pressure seal of extreme reliability which is external of the sealed components and can readily be checked by X-radiography.

In carrying out the process, the bulkhead 7 is set in position on the casing 6 with the cables 3, 14 passing through their respective holes, and forced against its seating on the casing by, for example, a hydraulic ram. A mould of suitable size is positioned to surround the castellated skirt 10 and wall 15, and an injection moulding machine of adequate capacity is connected thereto. The mould is then heated to a temperature of about 200° C. depending on the grade of the polythene to be injected, and the polythene injected to form the moulded seal. A bounding process may be applied if necessary to provide the adhesion of the polythene to the casing and bulkhead. The moulding of the cable entry gland 26 and that for the moisture detector may be carried out before or after the sealing process.

In the above method, the extent of heating of the bulkhead is greatly reduced compared with that of standard techniques and consequently the position of the cable 3 can be offset to facilitate coiling of the cable after leaving the bulkhead and to include the cable 14 attached to which is the moisture detector 13 or some other direct monitoring feature. As the moulding of the entry glands can be carried out after the bulkhead has been placed in position on the casing, the coiling on the inner side can be dispensed with. This facilitates the use of a cable of larger diameter than previously used and reduces the length of the housing. A further advantage is the ease with which the polythene seal can be cut away without damage to the metal parts of the assembly and replaced should it be necessary to gain access to the inner unit. The low temperature of about 200° C. at which the seal is formed has no metallurgical effect on the steel housing.

We claim:
1. A closure arrangement for an aperture comprising a peripheral wall defining the aperture to be closed, a plurality of circumferential projections carried on the external surface of said wall, an aperture closure member having a peripheral skirt, a plurality of circumferential projections carried on the external surface of said peripheral skirt, which projections are in proximity to the projections of the said wall when the aperture is closed by the closure member, and a moulded seal to surround completely the proximate projections of the peripheral wall and peripheral skirt.

2. A closure arrangement as claimed in claim 1 in which the moulded seal is of polythene.

3. A closure arrangement as claimed in claim 1 and further including a boss member on the closure member operable to extend within the peripheral wall defining the aperture.

4. A closure arrangement as claimed in claim 1 including a cylindrical sleeve member carried on the external face of the peripheral wall and forming an extension of that wall over the closure member, an internal thread at the distal end of the cylindrical sleeve member, and a threaded retaining ring co-operable with the cylindrical sleeve member to assist in holding the closure member in position in the aperture.

5. A closure arrangement as claimed in claim 3 including a sealing ring positioned between the base of the boss member and the inside of the base of the peripheral wall round the aperture.

6. A closure member as claimed in claim 5 in which the sealing ring is of lead.

7. A closure arrangement as claimed in claim 1 in which the end face of the peripheral wall is positioned adjacent but spaced from the end face of the peripheral skirt, the moulded seal completely surrounding the projections of both the peripheral wall and the peripheral skirt, and also penetrating the space between the end faces.

8. A closure arrangement as claimed in claim 7 and further including a circumferential groove formed in the outer surface of the portion of the moulded seal penetrating the space between the end faces.

References Cited

UNITED STATES PATENTS 3,095,994   7/1963   Bush _____ 220—46

FOREIGN PATENTS 580,211   7/1959   Canada.

JAMES B. MARBERT, Primary Examiner